(12) United States Patent
Sato

(10) Patent No.: US 12,309,495 B2
(45) Date of Patent: May 20, 2025

(54) PROCESSING METHOD OF CONFERENCE SYSTEM, AND CONFERENCE SYSTEM

(71) Applicant: YAMAHA CORPORATION, Hamamatsu (JP)

(72) Inventor: Koichiro Sato, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 312 days.

(21) Appl. No.: 18/172,048

(22) Filed: Feb. 21, 2023

(65) Prior Publication Data
US 2023/0300465 A1 Sep. 21, 2023

(30) Foreign Application Priority Data

Mar. 16, 2022 (JP) ................. 2022-041682

(51) Int. Cl.
H04N 23/69 (2023.01)
G06T 7/70 (2017.01)
(Continued)

(52) U.S. Cl.
CPC ............... *H04N 23/69* (2023.01); *G06T 7/70* (2017.01); *H04N 23/611* (2023.01); *H04N 23/62* (2023.01); *H04N 23/667* (2023.01); *H04N 23/695* (2023.01); *H04R 1/326* (2013.01); *H04R 3/00* (2013.01)

(58) Field of Classification Search
CPC ...... H04N 23/69; H04N 23/611; H04N 23/62; H04N 23/667; H04N 23/695; G06T 7/70; H04R 1/326; H04R 3/00; H04R 1/406; H04R 2430/20; H04R 7/147; H04R 3/005
See application file for complete search history.

(56) References Cited

U.S. PATENT DOCUMENTS 8,251,820 B2 * 8/2012 Marks ................... A63F 13/213
463/36

FOREIGN PATENT DOCUMENTS

JP 2013016933 * 1/2013 ............. H04N 5/232
JP 2013016933 A 1/2013

OTHER PUBLICATIONS

Foreign reference (Year: 2013).*

* cited by examiner

Primary Examiner — Yosef K Laekemariam
(74) Attorney, Agent, or Firm — ROSSI, KIMMS & McDOWELL LLP

(57) ABSTRACT

A processing method of a conference system includes a microphone, a camera, and a first object. The processing method obtains image data of an image taken by the camera, the image data including a plurality of objects, detects kinds and positions of a plurality of objects included in the image data obtained, identifies the first object and one or more second objects different from the first object based on the detected kinds of plurality of the objects from among the plurality of objects included in the obtained image data, calculates (i) a position of the first object and (ii) positions of the one or more second objects relative to the first object, selects a second object, from among the one or more second objects, whose position relative to the first object satisfies a specified condition, generates focused image data that focuses on the selected second object, and generates output data based on the generated focused image data, which focuses on the selected second object, and audio data picked up by the microphone.

19 Claims, 16 Drawing Sheets

(51) Int. Cl.
*H04N 23/611* (2023.01)
*H04N 23/62* (2023.01)
*H04N 23/667* (2023.01)
*H04N 23/695* (2023.01)
*H04R 1/32* (2006.01)
*H04R 3/00* (2006.01)

PROCESSING METHOD OF CONFERENCE SYSTEM, AND CONFERENCE SYSTEM

CROSS REFERENCE TO RELATED APPLICATIONS

This Nonprovisional application claims priority under 35 U.S.C. § 119(a) on Patent Application No. 2022-041682 filed in Japan on Mar. 16, 2022, the entire contents of which are hereby incorporated by reference.

BACKGROUND

Technical Field

The present disclosure relates to a processing method of a conference system, and a conference system.

Background Information

Japanese Patent Application Publication No. 2013-16933 discloses a terminal device that detects, in an image taken by a camera, faces of people (participants), a whiteboard and a specific object as objects seen in the image. The terminal device disclosed in Japanese Patent Application Publication No. 2013-16933 automatically sets priorities among the faces of people, the whiteboard, and the specific object, and determines image correction appropriate for the high-priority object.

SUMMARY

The terminal device disclosed in Japanese Patent Publication No. 2013-16933 automatically sets priorities among objects seen in an image and corrects the image appropriately for the high-priority object, regardless of the user's intention. Therefore, such a device or method that automatically detects objects cannot produce an image that reflects the user's intention.

An object of an embodiment of the present disclosure is to provide a processing method of a conference system that can output an image that reflects the user's intention even when objects are detected automatically.

A processing method of a conference system according to an embodiment of the present disclosure includes a microphone, a camera, and a first object. The processing method obtains image data of an image taken by the camera, the image data including a plurality of objects, detects kinds and positions of a plurality of objects included in the image data obtained, identifies the first object and one or more second objects different from the first object based on the detected kinds of plurality of the objects from among the plurality of objects included in the obtained image data, calculates (i) a position of the first object and (ii) positions of the one or more second objects relative to the first object, selects a second object, from among the one or more second objects, whose position relative to the first object satisfies a specified condition, generates focused image data that focuses on the selected second object, and generates output data based on the generated focused image data, which focuses on the selected second object, and audio data picked up by the microphone.

The embodiment of the present disclosure makes it possible to output an image that reflects the user's intention even when objects are automatically detected.

DETAILED DESCRIPTION

First Embodiment

Figure 1:
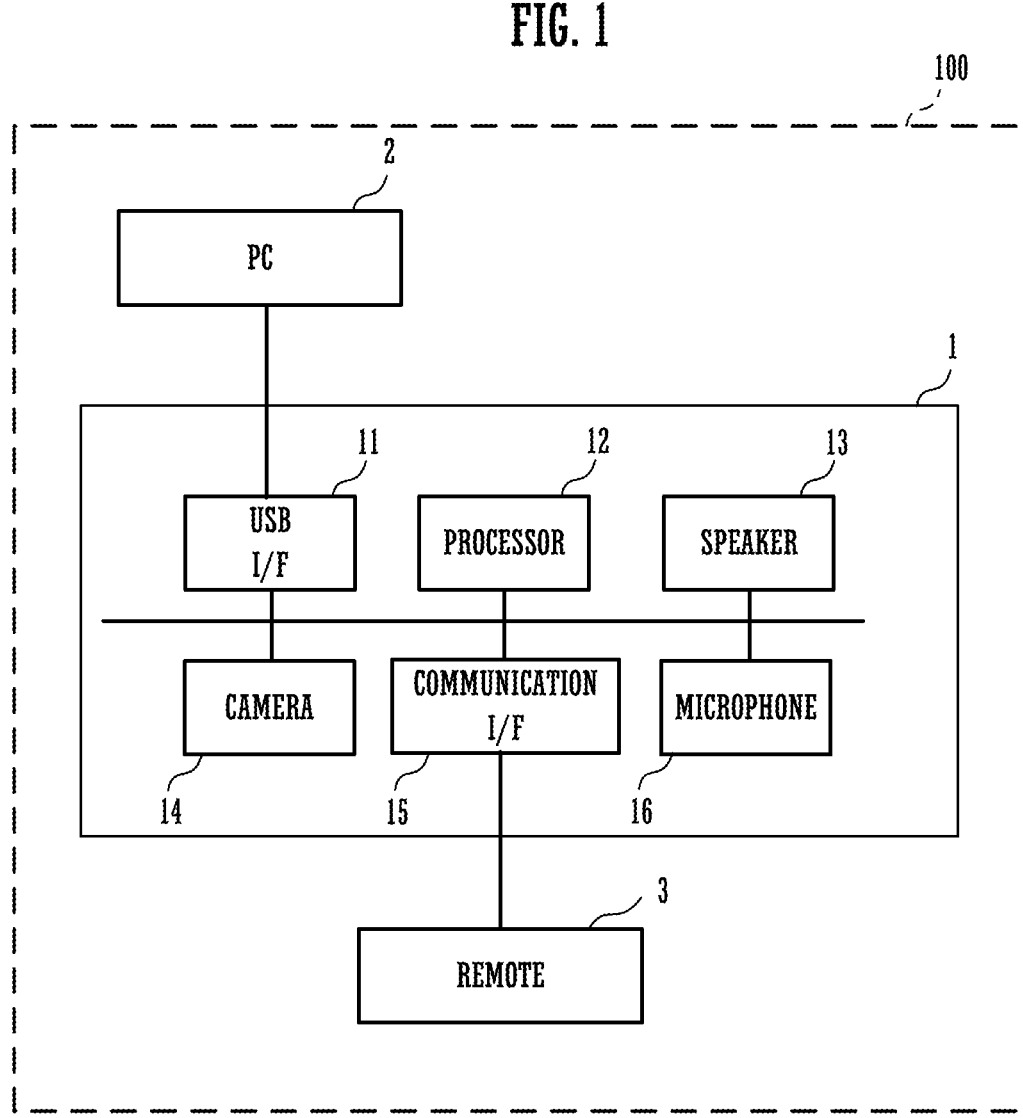
FIG. 1 is a block diagram showing an exemplary configuration of a conference system and an exemplary configuration of a terminal.
Figure 2:
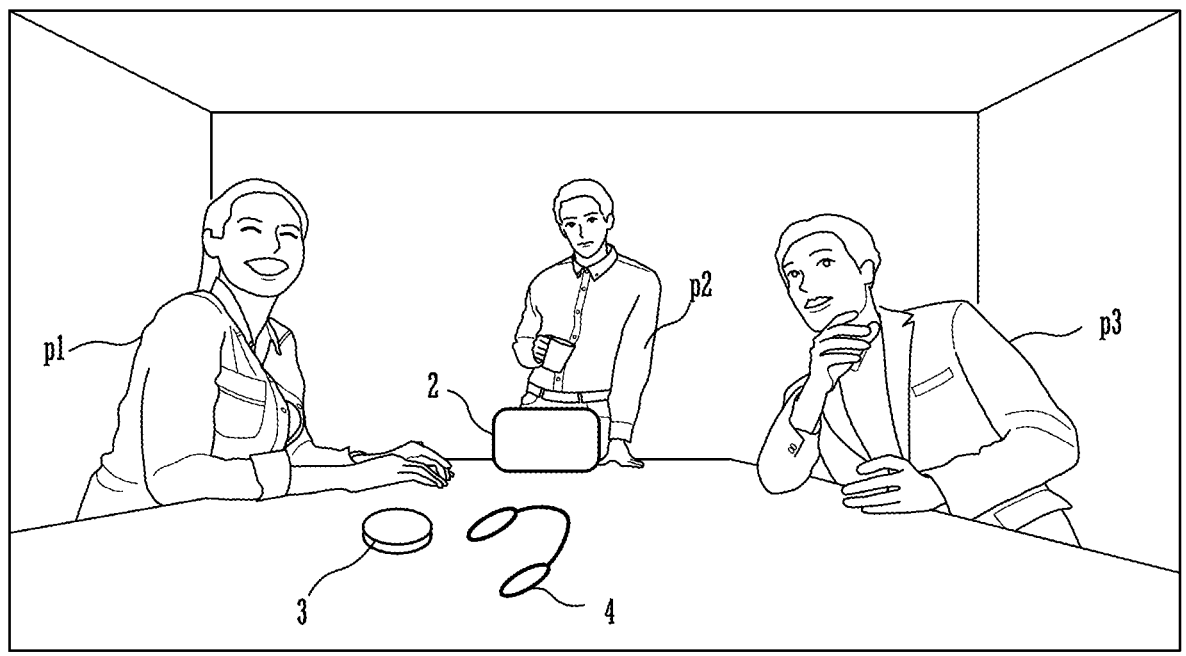
FIG. 2 is an illustration showing an example of an image taken by a camera during a conference.

With reference to FIGS. 1, 2, 3, 4, 5, 6, 7, 8 and 9, a conference system 100 according to a first embodiment will hereinafter be described. FIG. 1 is a block diagram showing an exemplary configuration of the conference system 100 and an exemplary configuration of a terminal 1. FIG. 2 is an illustration showing an example of an image taken by a camera 14 during a conference. The conference system 100 is a system for connecting to an information processing device, such as a PC or the like, in a remote location to hold a web meeting. The conference system 100 includes a terminal 1, a PC 2, and a remote controller 3. The remote controller 3 (which will hereinafter be referred to as remote 3) is to control the terminal 1. In this embodiment, the remote 3 is an example of a first object according to the present disclosure.

As shown in FIG. 1, the terminal 1 includes a USB I/F 11, a processor 12, a speaker 13, a camera 14, a communication I/F 15, and a microphone 16.

The camera 14 shoots footage of a conference, in which a participant p1, a participant p2 and a participant p3 are attending, held in a meeting room. In the example shown by FIG. 2, the camera 14 takes an image of the participants p1, p2 and p3, the PC 2 placed on a desk that those participants p1, p2 and p3 gather around, the remote 3, and a prototype 4 (headphone).

The microphone 16 picks up sound in the meeting room. More specifically, the microphone 16 picks up the speaker's voice.

The USB I/F 11 is connected to the PC 2. The USB I/F 11 sends the PC 2 image data of an image taken by the camera 14 and audio data picked up by the microphone 16. The USB I/F 11 receives, from the PC 2, audio data that the PC 2 received from a device in a remote location. The speaker 13 emits sound based on the audio data received via the USB I/F 11.

The communication I/F 15 is connected to the remote 3 by wireless, such as Bluetooth (registered trademark), Wi-Fi (registered trademark) or the like, or by wire. The communication I/F 15 receives data in accordance with various kinds of operations that the remote 3 received.

The processor 12 is, for example, a CPU, and performs overall control of the terminal 1. A detailed description of the processor 12 will be given later.

Figure 3:
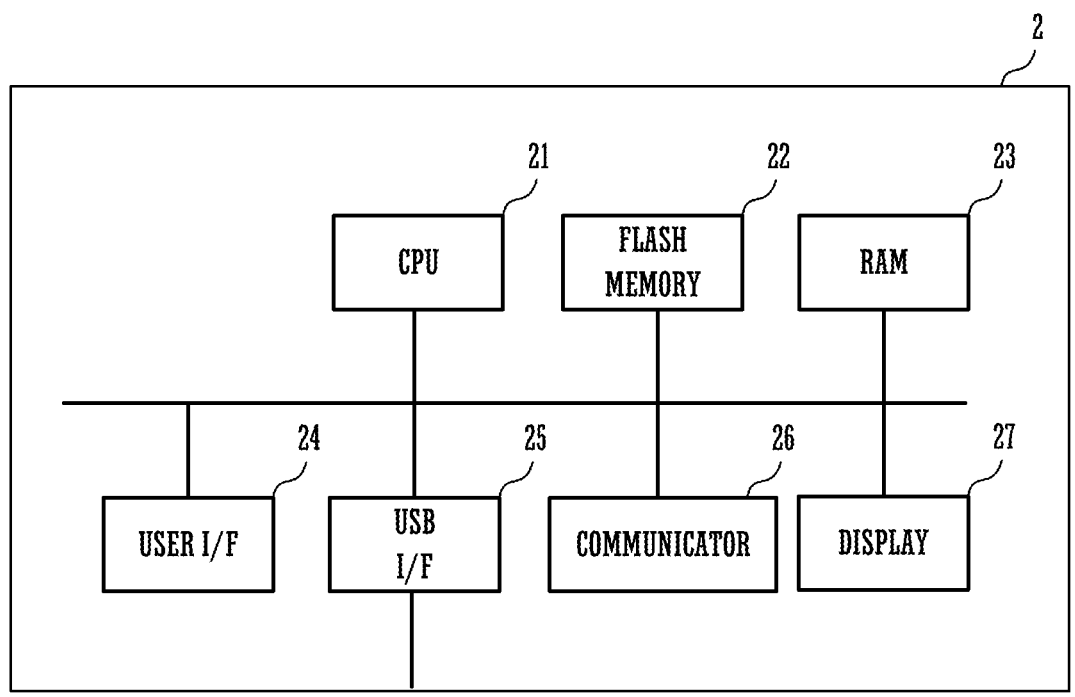
FIG. 3 is a block diagram showing an exemplary configuration of a personal computer.

The PC 2 is a general-purpose personal computer. FIG. 3 is a block diagram showing an exemplary configuration of the PC 2. As shown by FIG. 3, the PC 2 includes a CPU 21, a flash memory 22, a RAM 23, a user I/F 24, a USB I/F 25, a communicator 26, and a display 27.

The communicator 26 is a network interface of a wireless LAN or a wired LAN, and the communicator 26 is connected to a PC in a remote location via the network. The PC 2 sends a PC in a remote location image data of an image (see FIG. 2) and audio data of sound taken and picked up by the terminal 1 via the communicator 26. The PC 2 also receives, from the PC in the remote location, image data of an image and audio data of sound taken and picked up in the remote location via the communicator 26.

The CPU 21 reads a web-meeting program from the flash memory 22 to the RAM 23 and connects to the PC in the remote location via the network to carry out a web meeting. The user I/F 24 includes a mouse, a keyboard, etc., and receives operation by a participant. The participant, for example, gives a command via the user I/F 24 to start the web-meeting program.

The USB I/F 25 is connected to the terminal 1. The PC2 receives output data, which includes audio data and image data, from the terminal 1 via the USB I/F 25.

The PC 2 displays an image relating to the web meeting on the display 27, based on the image data received from the PC in the remote location and the image data received from the terminal 1.

Figure 4:
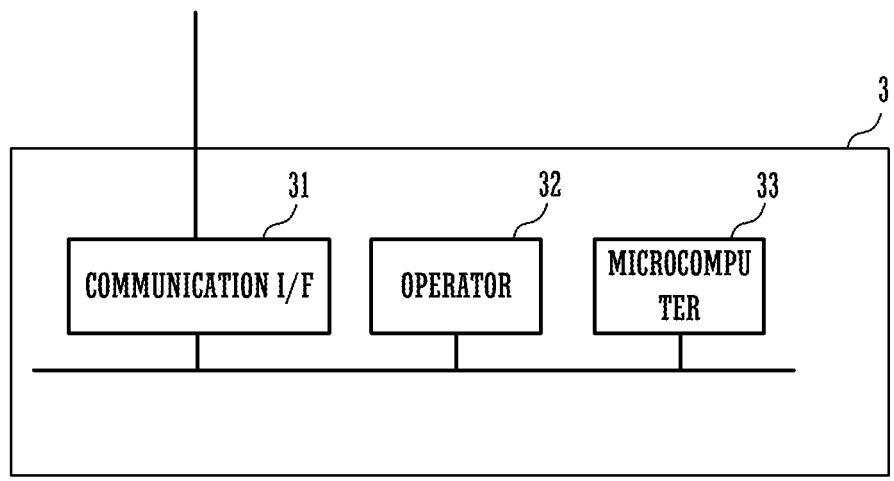
FIG. 4 is a block diagram showing an exemplary configuration of a remote controller.
Figure 5:
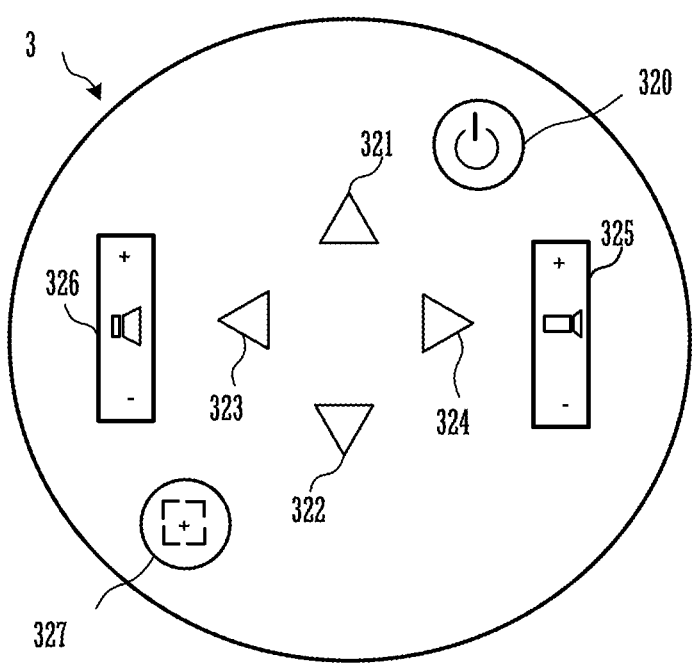
FIG. 5 is a schematic external view of an operator.

The remote 3 will be described with reference to FIGS. 4 and 5. FIG. 4 is a block diagram showing an exemplary configuration of the remote 3. FIG. 5 is a schematic external view of an operator 32. The remote 3, as shown by FIG. 4, includes a communication I/F 31 and a microcomputer 33 in addition to the operator 32.

The communication I/F 31 is connected to the terminal 1 by wireless communication means, such as Bluetooth (registered trademark), Wi-Fi (registered trademark), or the like, or by wire communication means.

The operator 32 receives commands from participants. The operator 32, for example, includes a plurality of keys displayed on a touch panel. As shown by FIG. 5, the operator 32 includes a power key 320, direction keys 321, 322, 323 and 324, a zoom key 325, a volume key 326, and a mode switching key 327. The operator 32 sends the terminal 1 data corresponding to the commands entered thereat via the communication I/F 31. The processor 12 of the terminal 1 carries out various kinds of processing in accordance with commands entered at the operator 32.

The power key 320 powers on and powers off the remote 3 (including switching on and off stand-by operation) by touch interactions.

The direction keys 321, 322, 323 and 324 are keys to change the direction of the camera 14 for image pickup. The direction key 321 indicating an upward direction and the direction key 322 indicating a downward direction are for tilting, and the direction key 322 indicating a leftward direction and the direction key 324 indicating a rightward direction are for panning. Thus, the processor 12 carries out panning or tilting in accordance with the command entered at the direction keys 321, 322, 323 and 324. The zoom key 325 has a "+" key for zooming in and a "−" key for zooming out. The zoom key 325 receives a command to change the range of image pickup by the camera 14. Thus, the processor 12 changes the range of image pickup in accordance with the command entered at the zoom key 325.

The volume key 326 receives a command to change the volume of the speaker 13. Thus, the processor 12 changes the volume level of the speaker 13 in accordance with the command entered at the volume key 326.

The mode switching key 327 receives a mode switching command to switch between a default mode, in which the entire conference room is shot, a manual mode, in which the direction of the camera 14 for image pickup is changed in response to a command entered at the direction keys 321, 322, 323 and 324, and the zoom key 325, and an automatic object detection mode, in which objects are automatically detected. In other words, every time the mode switching key 327 is tapped, the processor 12 switches from the default mode to the manual mode and then to the automatic object detection mode. Triggered by operation of the mode switching key 327, the processor 12 switches from the default mode to the automatic object detection mode in order to generate image data of an image focusing on an object as desired by the participants (in this example, prototype 4).

The objects herein include, for example, the "remote" and "objects other than the remote". In other words, the "remote" and "objects other than the remote" are kinds of objects. Also, the objects herein include persons, such as the participants p1, p2 and p3, and not persons but things, such as the PC 2 and the prototype 4.

The automatic object detection mode will be described in detail. During a conference carried out by the conference system 100, the participants may sometimes wish to send a PC in a remote location image data of an image focusing on a desired object (for example, the prototype 4) selected from the image of the entire conference room taken in the default mode (see FIG. 2). More specifically, the participants may wish to generate image data that permits a zoomed-in image of the prototype 4 to be displayed in the center of the screen. In this case, the participants put the remote 3 near the prototype 4.

In the conference system 100, the remote 3 is an attachment to the terminal 1. Therefore, the appearance of the remote 3 is specified beforehand by the terminal 1. The terminal 1 identifies the remote 3 as a first object among a plurality of detected objects. Meanwhile, the "objects other than the remote" that are not specified beforehand by the terminal 1 are all identified as second objects. Specifically, the terminal 1 identifies the participant p1, the participant p2, the participant p3, the PC 2 and the prototype 4 as second objects. The terminal 1 selects one second object that is located near the remote 3 (first object) out of all the second objects. The terminal 1 generates image data with a focus on the selected second object. The phrase "identifying the first object" used herein means identifying the object specified beforehand by the terminal 1.

Figure 6:
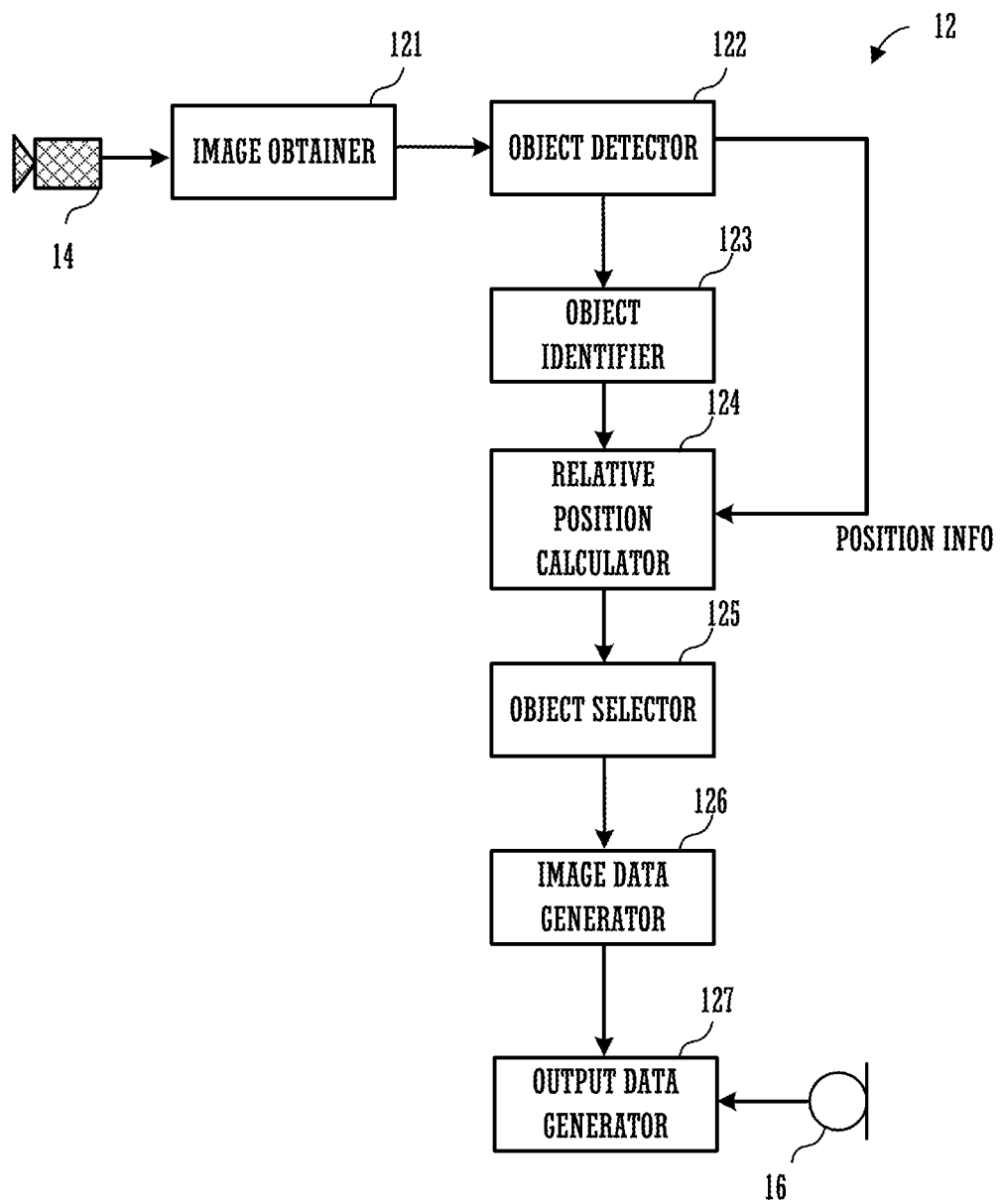
FIG. 6 is a block diagram showing the functional configuration of a processor.
Figure 7:
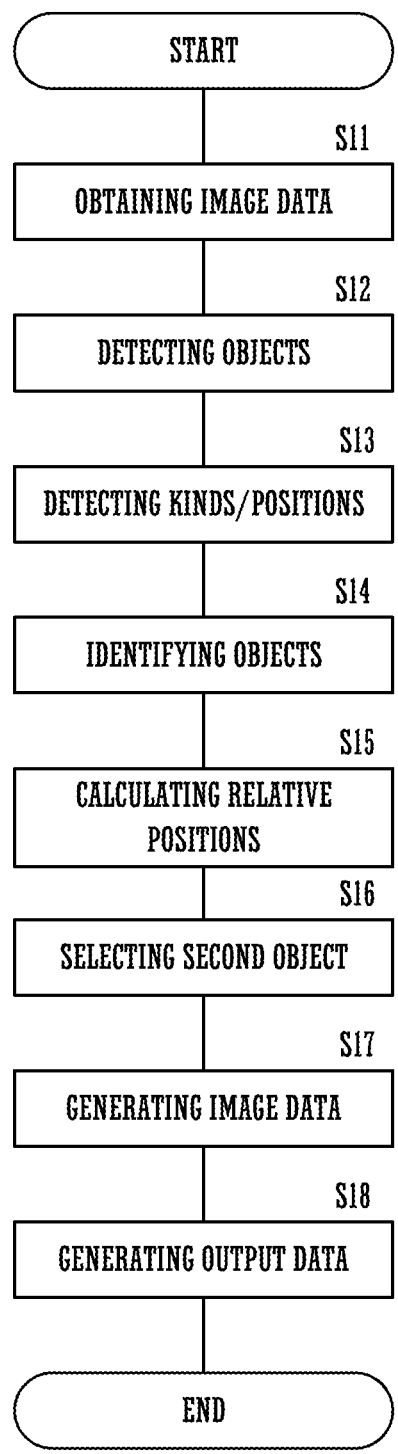
FIG. 7 is a flowchart showing an example of processing (image generation processing) performed by the processor.
Figure 8:
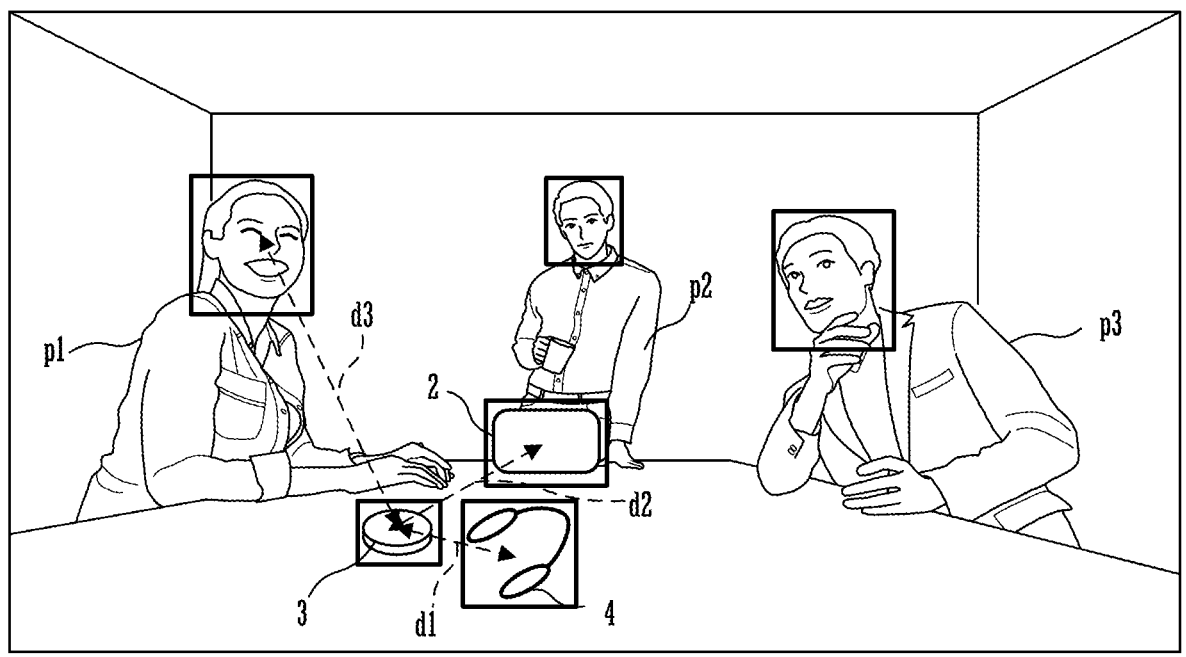
FIG. 8 is an illustration showing an image in which bounding boxes of objects are indicated.

The function and operation of the processor 12 of the terminal 1 to generate output data including image data focusing on the prototype 4 will be described in detail. FIG. 6 is a block diagram showing the functional configuration of the processor 12 of the terminal 1. FIG. 7 is a flowchart showing an example of processing (output data generation processing) performed by the processor 12. FIG. 8 is an illustration showing an image in which bounding boxes of objects are indicated.

As shown by FIG. 6, the processor 12 functionally includes an image obtainer 121, an object detector 122, an object identifier 123, a relative position calculator 124, an object selector 125, an image data generator 126, and an output data generator 127. The image obtainer 121, the object detector 122, the object identifier 123, the relative position calculator 124, the object selector 125, the image data generator 126, and the output data generator 127 perform output data generation processing.

The image obtainer 121 obtains image data of an image taken by the camera 14 (S11). The object detector 122 detects a plurality of objects (participant p1, participant p2, participant p3, PC 2, remote 3, and prototype 4) included in the obtained image data (S12). The object detector 122 performs face recognition processing of the image data of the image shown by FIG. 2 to recognize the faces of the participants p1, p2 and p3. The face recognition processing is recognizing the positions of faces, for example, by using a specified algorithm employing a neural network approach or the like. The object detector 122 performs recognition processing to recognize the PC 2, the remote 3 and the prototype 4. For the recognition processing to recognize things, such as the PC 2, the remote 3 and the prototype 4, for example, a specified algorithm employing a neural network approach or the like is also used.

The object detector 122 detects the kind and position of each of the detected objects (S13). In this example, the object detector 122 performs labelling of each of the detected objects depending on the kind. The labelling is, for example, giving a name to a detected object and memorizing the object. More specifically, the object detector 122 labels each of the participants p1, p2 and p3 as "person". Also, the object detector 122 labels the remote 3 as "remote of the terminal 1". The object detector 122 labels the PC 2 as "PC". Furthermore, the object detector 122 labels the prototype 4 as "headphone".

The object identifier 123 identifies a first object and one or more second object among the six detected objects (participant p1, participant p2, participant p3, PC 2, remote 3 and prototype 4), according to the kind. The object identifier 123 identifies the remote 3 labelled as "remote of the terminal 1" as a first object. Also, the object identifier 123 identifies the objects that are not the first object ("person", "PC" and "headphone"), namely, the participants p1, p2 and p3, the PC 2 and the prototype 4 as second objects (S14).

The object detector 122 detects the position (for example, the XY coordinates of the pixel) of each of the first and second objects detected at S12. In this specification, the position of an object is, for example, the coordinates of the center of the square bounding box as shown in FIG. 8. When someone's face is recognized, a bounding box is set to include the person's face. When something that is not a person is detected as an object, a bounding box is set to enclose that thing entirely.

The relative position calculator 124 calculates the positions of the participants p1, p2 and p3, the PC 2 and the prototype 4 (second objects) relative to the remote 3 (first object), that is, the positional relationship between the first object and each of the second objects (S15). The way to calculate the relative positions will be described in detail with reference to dashed lines d1, d2 and d3 shown in FIG. 8. The dashed line d1 connects the center of the bounding box enclosing the remote 3 identified as a first object (pixel located on the coordinates (x1, y1)) and the center of the bounding box enclosing the prototype 4 (pixel located on coordinates (x2, y2)). The dashed line d2 connects the center of the bounding box enclosing the remote 3 (pixel located on coordinates (x1, y1)) and the center of the bounding box enclosing the PC 2 (pixel located on coordinates (x3, y3)). The dashed line d3 connects the center of the bounding box enclosing the remote 3 (pixel located on coordinates (x1, y1)) and the center of the bounding box including the face of the participant p1 (pixel located on coordinates (x4, y4)). The relative position calculator 124 calculates the lengths of the dashed lines d1, d2 and d3 from the coordinates of the pixels. In other words, the relative position calculator 124 calculates the distance between the first object (remote 3) and each of the second objects. The terminal 1 is not required to display the dashed lines d1, d2 and d3 on the screen. In this example, the distance is a distance on the screen.

Out of one or more second objects, the object selector 125 selects one second object whose position relative to the first object satisfies a specified condition. In the present embodiment, the specified condition is that the distance from the first object is the shortest among the one or more second objects. Based on the calculated relative positions, the object selector 125 selects the prototype 4 as the second object that is positioned closest to the remote 3 (S16). Specifically, the object selector 125 compares the lengths of the dashed lines d1, d2 and d3 with one another, and selects a second object that is connected to the remote 3 by the shortest dashed line. The image data generator 126 performs image processing of image data with a focus on the prototype 4, which is the selected second object (S17).

Figure 9:
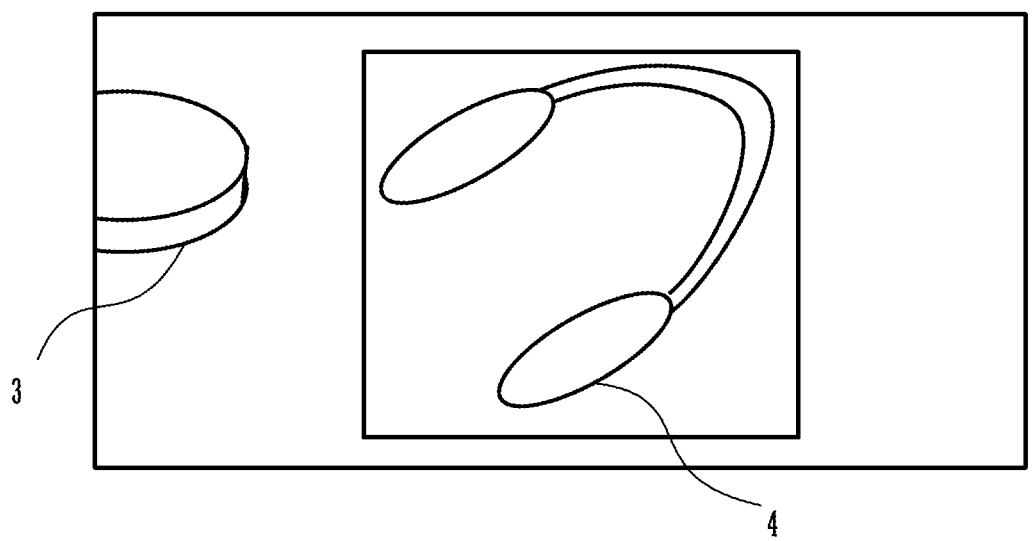
FIG. 9 is an example of an image focusing on a second object (prototype).

FIG. 9 is an example of an image focusing on the prototype 4. Specifically, the image data generator 126 performs image processing so that a zoomed-in image of the prototype 4 can be displayed in the center of the screen. For example, the image data generator 126 performs panning and tilting so that the prototype 4 will be displayed in the center of the screen. Further, the image data generator 126 performs zooming so that the occupancy of the prototype 4 in the screen will be a specified rate (for example, 50%). In this way, the image data generator 126 generates image data that permits the prototype 4 to be displayed in the center of the screen at a specified occupancy. In the present specification, the occupancy is expressed by the number of pixels in the bounding box divided by the number of pixels of the entire screen.

The output data generator 127 generates output data based on the image data with image processing and audio data picked up by the microphone 16 (S18).

Some conventional conference systems have a function to detect objects automatically (that is, are operable in what is called an automatic framing mode). In the automatic framing mode, in order to display a zoomed-in image of a person's face, the conference system recognizes a person's face by face recognition and generates image data with a focus on the recognized person's face. Thus, such a conventional conference system automatically recognizes the participants' faces. When the participants wish to generate an image data with a focus on an object that is not a person, such a conventional conference system cannot determine which object in the image data the participants wish to focus on.

However, the conference system 100 according to the present embodiment identifies the remote 3, which is specified beforehand by the terminal 1, as "remote (first object)". The conference system 100 also identifies the other objects as "objects other than the remote (second objects)". Then, the conference system 100 generates image data with a focus on one of the "objects other than the remote" that is positioned closest to the "remote". In this way, the conference system 100 can generate image data with a focus on an object that is not a person and is positioned close to the "remote". Thus, the conference system 100 can generate image data that permits an object (second object) that is not specified beforehand by the terminal 1 to be zoomed in and displayed in the center of the screen only if this object is positioned close to the remote 3. Therefore, even when the conference system 100 automatically detects a plurality of objects, the conference system 100 can output an image reflecting the user's intention.

The conference system 100 selects one out of the second objects, triggered by operation received at the operator 32. More specifically, since the conference system 100 can receive commands at the operator 32, the conference system 100 can switch between an image of the entire meeting room including the participants p1, p2 and p3, the PC 2, the remote 3 and the prototype 4, and an image focusing on the second object (prototype 4) positioned closest to the remote 3 easily at any time the participants desire.

In the above-described example, in order to generate image data with a focus on the second object selected by the image data generator 126 (prototype 4 in the above-described example), the processor 12 performs image processing. However, in order to generate image data with a focus on the second object selected by the image data generator 126, the image data generator 126 may control the camera 14. In this case also, the image data generator 126, for example, performs framing by panning, tilting, and zooming. For example, as shown by FIG. 9, the image data generator 126 controls the camera 14 and specifically performs panning and tilting so that the prototype 4 can be displayed in the center of the screen. Additionally, the image data generator 126 controls the camera 14 and specifically performs zooming so that the occupancy of the prototype 4 in the screen will be a specified rate (for example, 50%).

[First Modification]

Figure 10:
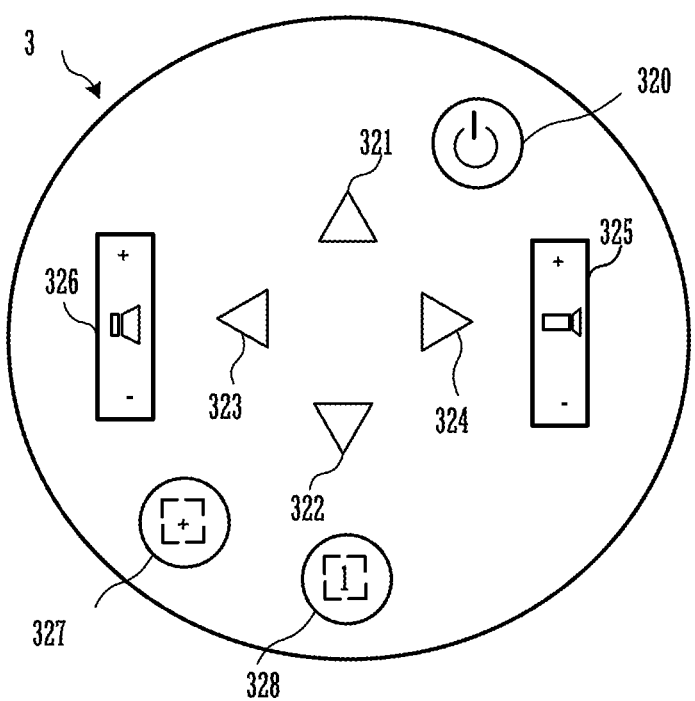
FIG. 10 is a schematic external view of an operator according to a first modification.
Figure 11:
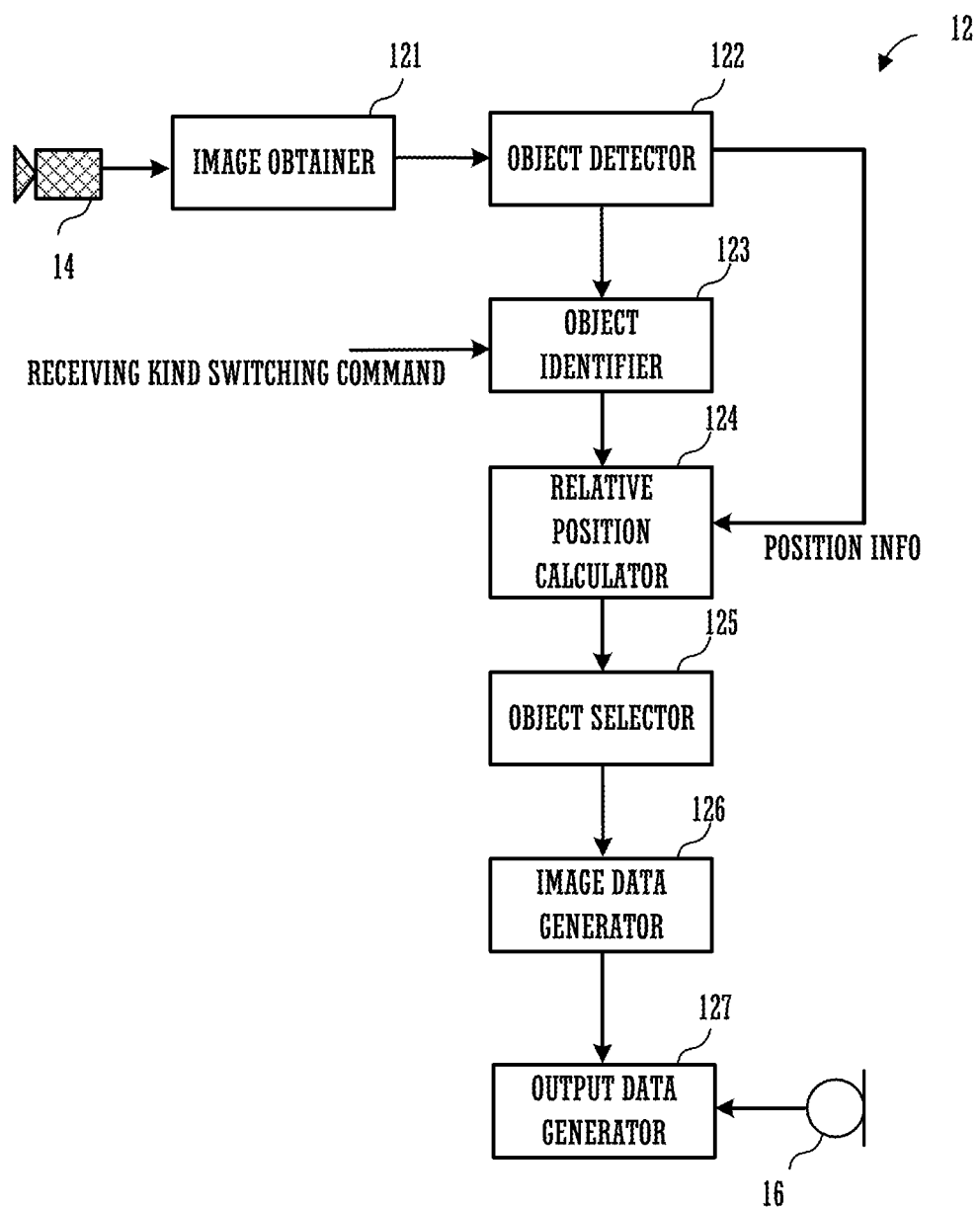
FIG. 11 is a block diagram showing the functional configuration of a processor according to the first modification.

A conference system 100 according to a first modification will be described with reference to FIGS. 10 and 11. FIG. 10 is a schematic external view of an operator 32 according to the first modification. FIG. 11 is a block diagram showing the functional configuration of a processor 12 according to the first modification.

A terminal 1 according to the first modification selects one or more second objects of a reference kind, out of a plurality of second objects. The "reference kind" is a kind of second objects and specifically a kind named "persons" or a kind named "not persons but things". In other words, according to the first modification, a plurality of second objects are classified into "persons" and "not persons but things". In the case of FIG. 2, the participant p1, the participant p2 and the participant p3 are classified into "persons". In the case of FIG. 2, the PC 2 and the prototype 4 are classified into "not persons but things". The terminal 1 according to the first modification receives a selection command for selection of a kind of second objects. The terminal 1 according to the first modification identifies one or more second objects classified into the kind specified by the selection command, and further selects a second object satisfying a specified condition out of the one or more second objects identified as the selected kind. Elements same as in the first embodiment will be provided with the same reference symbols and will not be described any more.

As shown in FIG. 10, the operator 32 of the remote 3 includes an object kind switching key 328. The object kind switching key 328 receives a switching command for switching of the reference kind of second objects. In other words, the object kind switching key 328 receives a switching command for switching of the reference kind to "persons" or to "not persons but things". As shown in FIG. 11, every time the object kind switching key 328 is tapped, the object identifier 123 switches the reference kind of second objects to "persons" or to "not persons but things". In this example, what are classified into "persons" are the participant p1, the participant p2 and the participant p3. In this example, what are classified into "not persons but things" are the PC 2 and the prototype 4.

The object detector 122 detects the participant p1, the participant p2, the participant p3, the PC 2, the remote 3 and the prototype 4 as objects, from the image data of the image shown by FIG. 2. The object identifier 123 identifies the remote 3 as a first object. The object identifier 123 identifies the participant p1, the participant p2, the participant p3, the PC 2 and the prototype 4 as second objects. Furthermore, the object identifier 123 identifies the participant p1, the participant p2, the participant p3 as "persons" and identifies the PC 2 and the prototype 4 as "not persons but things".

When the object identifier 123 switches the reference kind to "persons" in response to a command received at the object kind switching key 328, the relative position calculator 124 calculates the positions of the participant p1, the participant p2 and the participant p3 relative to the remote 3. Based on the calculation results, the object selector 125 selects, for example, the participant p1 that is positioned closest to the remote 3 (see FIG. 2).

When the object identifier 123 switches the reference kind to "not persons but things" in response to a command received at the object kind switching key 328, the relative position calculator 124 calculates the positions of the PC 2 and the prototype 4 relative to the remote 3. Based on the calculation results, the object selector 125 selects, for example, the prototype 4 that is positioned closest to the remote 3 (see FIG. 2).

Thus, the conference system 100 according to the first modification switches the reference kind of second objects in response to a command received at the object kind switching key 328. Accordingly, the conference system 100 according to the first modification can switch between an image focusing on a person closest to the remote 3 and an image focusing on a thing closest to the remote 3 at any time the user desires. Therefore, even when the conference system 100 according to the first modification automatically detects objects, the conference system 100 can output an image reflecting the user's intention.

The conference system 100 according to the first modification is not required to calculate the positions of all the second objects detected in the image relative to the first object. This makes it possible to reduce the area of memory for calculation in the conference system 100.

[Second Modification]

A conference system 100 according to a second modification will be described with reference to FIGS. 12 and 13.

Figure 12:
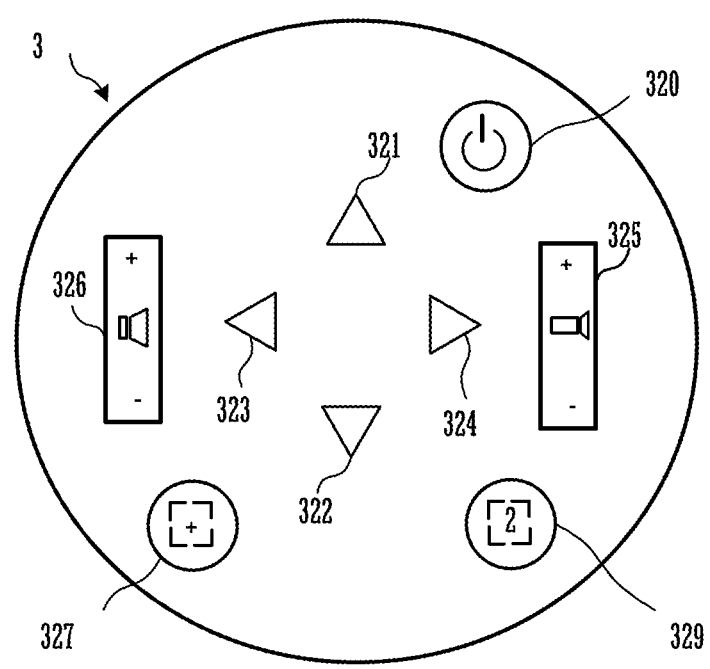
FIG. 12 is a schematic external view of an operator according to a second modification.
Figure 13:
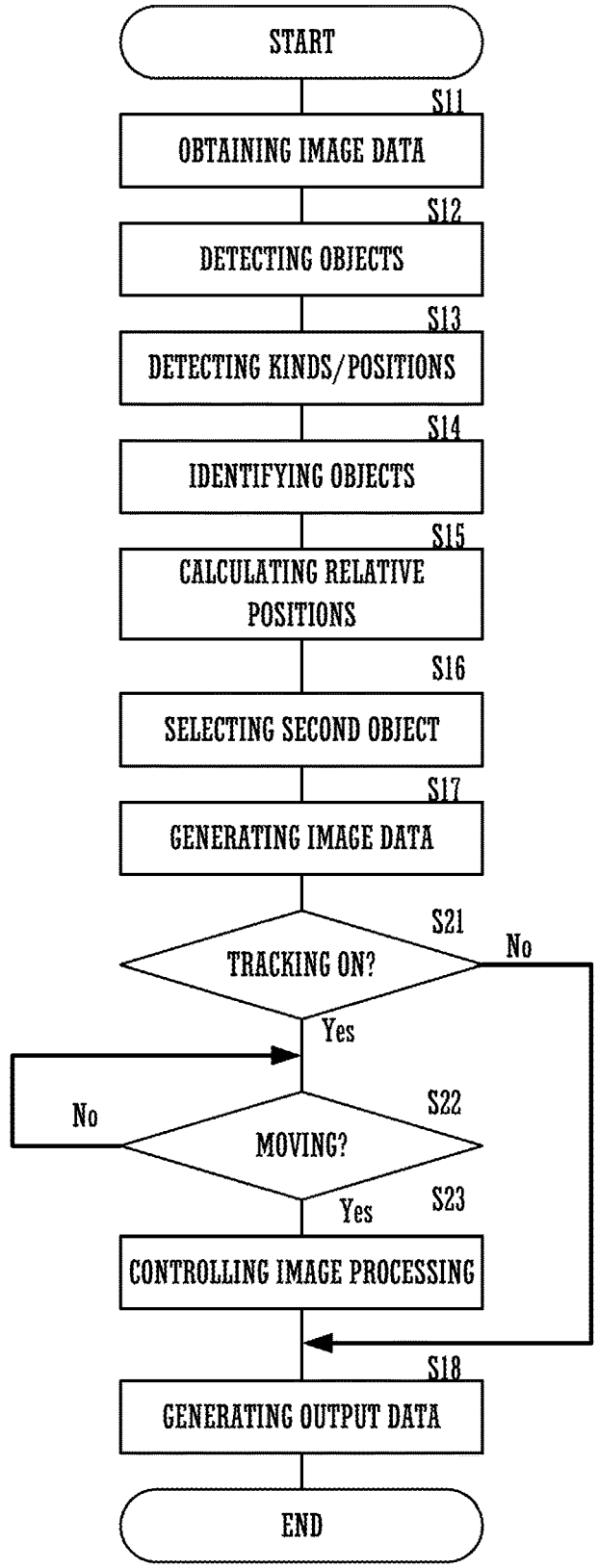
FIG. 13 is a flowchart showing an example of processing performed by a processor according to the second modification.

FIG. 12 is a schematic external view of an operator 32 according to the second modification. FIG. 13 is a flowchart showing an example of processing performed by a processor 12 according to the second modification. The conference system 100 according to the second modification receives a tracking command for tracking of a selected second object. The conference system 100 according to the second modification generates output data following the motion of the second object targeted for the tracking. Elements same as in the first modification will be provided with the same reference symbols and will not be described any more. The following is a description of a case in which the second object selected by the participants is the prototype 4.

As shown in FIG. 12, the operator 32 of the remote 3 includes a tracking on/off key 329. The tracking on/off key 329 receives a command regarding whether or not to track the selected second object (prototype 4 in this example). Every time the tracking on/off key 329 is tapped, the image data generator 126 switches to track the prototype 4 (turns on tracking) or not to track the prototype 4 (turns off tracking). When the tracking is on (Yes at S21) and when someone participating in the conference is moving the prototype 4 (Yes at S22), the image data generator 126 performs panning, tilting, and zooming following the motion of the prototype 4 so that a zoomed-in image of the prototype 4 can be displayed in the center of the screen (S23). In other words, the data generator 126 generates image data following the motion of the second object that was selected at the time of switching to the automatic object detection mode from any other mode (the default mode or the manual mode).

When the tracing is off (No at S21), the image data generator 126 keeps the framing the same as that at the time of switching to the automatic object detection mode from any other mode (the default mode or the manual mode). In other words, the image data generator 126 keeps the settings for image processing the same as those at the time of switching to the automatic object detection mode from any other mode (the default mode or the manual mode). Accordingly, when the tracking is off, the image data generator 126 does not make any changes in panning, tilting, and zooming, for example, even if someone participating in the conference moves the prototype 4.

The conference system 100 according to the second modification performs image processing following the motion of the selected second object (prototype 4) when the tracking is on. Thereby, even if the prototype 4 is moved, the conference system 100 can follow the motion of the prototype 4 and generate image data with a focus on the prototype 4.

The second modification has been described in connection with a case in which image processing is performed to generate image data with a focus on a selected second object (prototype 4 in the above-described example). However, the image data generator 126 may control the camera 14 in order to generate image data with a focus on the selected second object. In this case also, the image data generator 126, for example, performs framing by panning, tilting, and zooming. For example, the camera 14 is controlled so that the prototype 4 can be displayed in the center of the screen as shown in FIG. 9.

[Third Modification]

Figure 14:
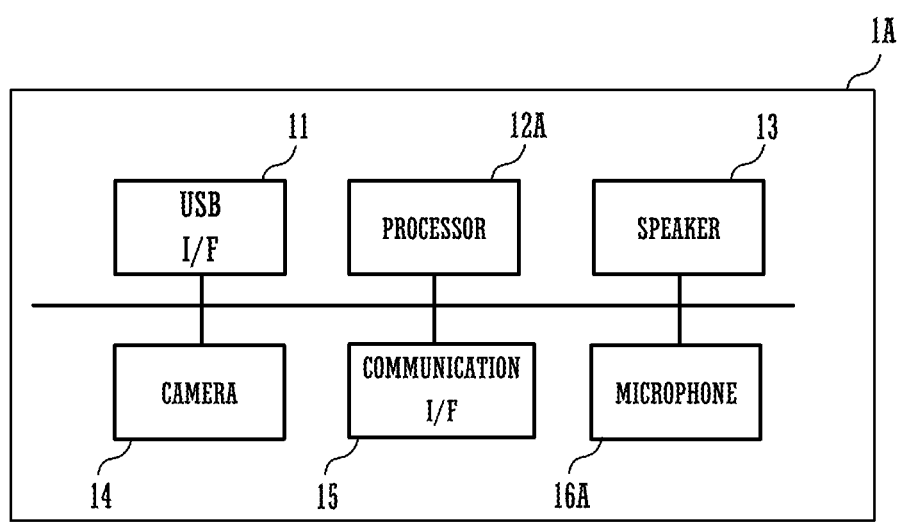
FIG. 14 is a block diagram showing the configuration of a terminal according to a third modification.
Figure 15:
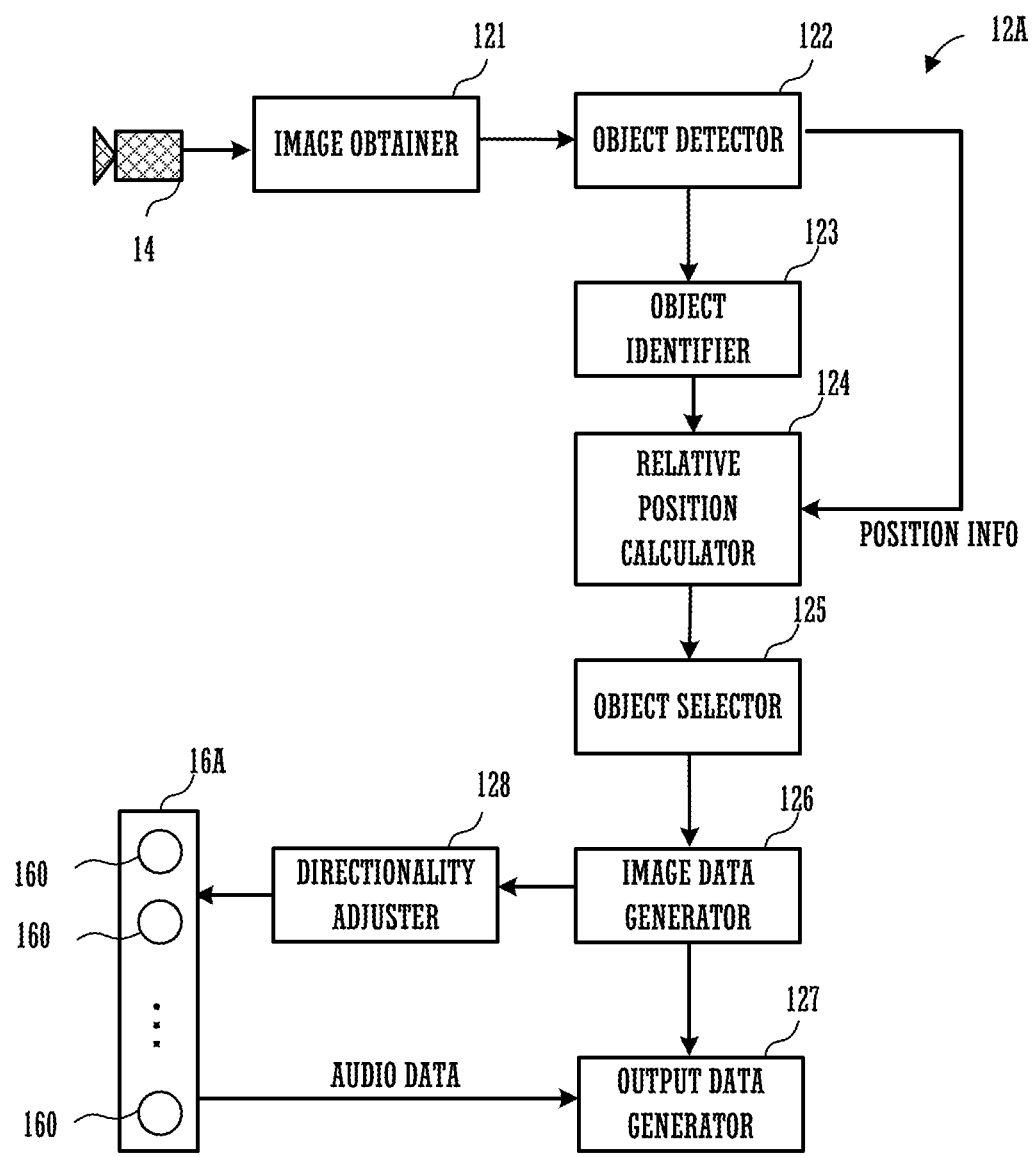
FIG. 15 is a block diagram showing the functional configuration of a processor according to the third modification.

A terminal 1A according to a third modification will be described with reference to FIGS. 14 and 15. FIG. 14 is a block diagram showing the configuration of the terminal 1A according to the third modification. FIG. 15 is a block diagram showing the functional configuration of a processor 12A according to the third modification. The conference system 100 according to the third modification adjusts directionality of a microphone 16A to a selected second object. Elements same as in the first embodiment will be provided with the same reference symbols and will not be described any more.

As shown in FIG. 14, the terminal 1A includes a microphone 16A. The microphone 16A is an array of microphones 160. As shown in FIG. 15, the processor 12A of the terminal 1A includes a directionality adjuster 128. The microphone 16A combines audio signals of the microphones 160 while providing a specified delay individually to the audio signals, controlled by the directionality adjuster 128.

The directionality adjuster 128 heightens the sensitivity to the direction toward the second object selected by the object selector 125 (for example, prototype 4), for example, by changing the amount of delay provided to the individual audio signals of the microphones 160. In other words, the directionality adjuster 128 adjusts the phase of the audio signal of each of the microphones 160 and thereby heightens the sensitivity to the direction toward the selected second object.

The output data generator 127 generates output data based on image data focusing on the selected second object (for example, prototype 4) and audio data of the sound of the second object picked up by the microphone 16A.

Thus, the conference system 100 according to the third modification puts emphasis on the sound emitted from the selected second object (prototype 4 in this example) and thereby can suppress unnecessary sound (noise, such as noise of an air conditioner, etc.).

[Fourth Modification]

Figure 16:
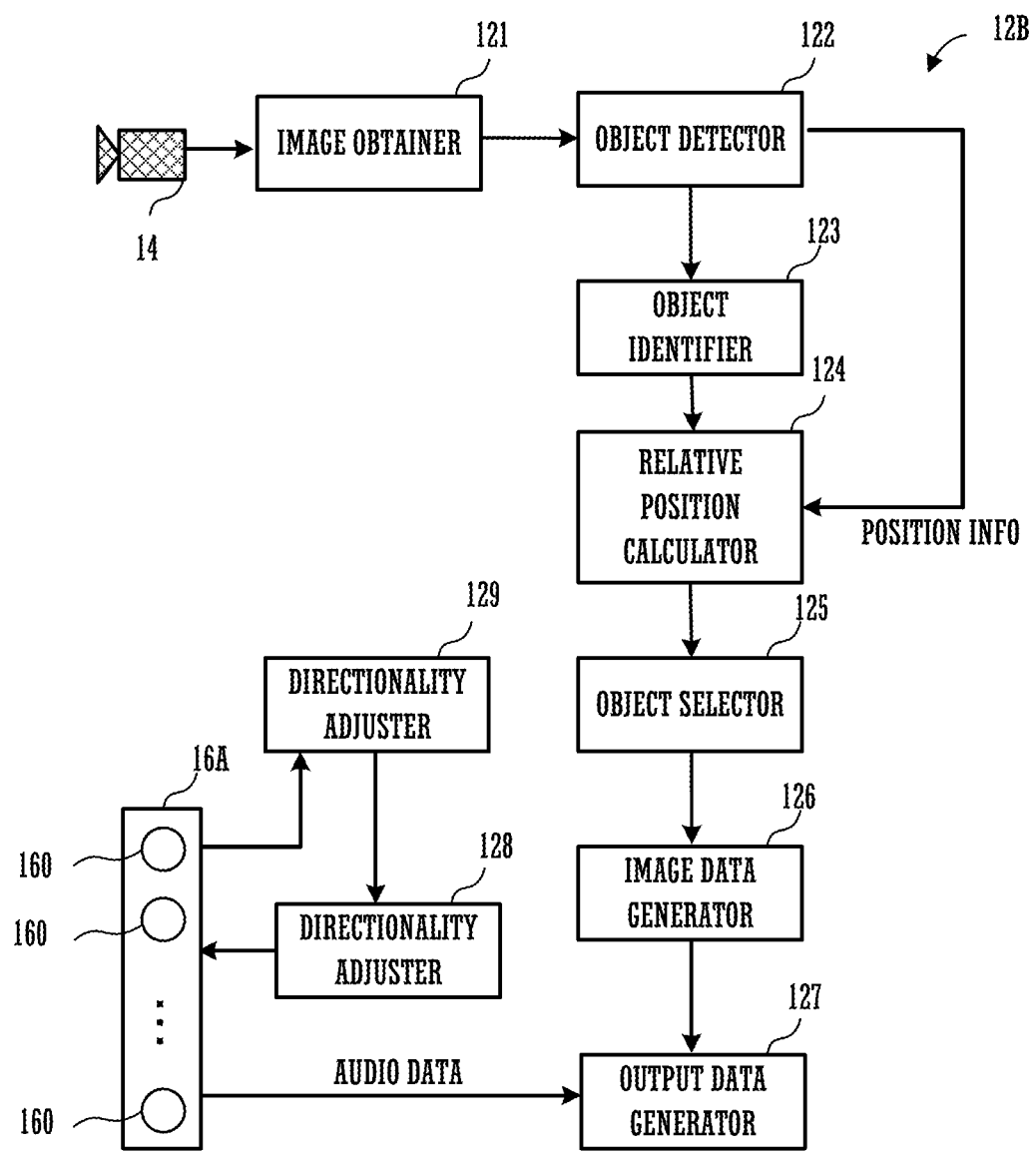
FIG. 16 is a block diagram showing the functional configuration of a processor according to a fourth modification.

A terminal 1A according to a fourth modification will be described with reference to FIG. 16. FIG. 16 is a block diagram showing the functional configuration of a processor 12B according to the fourth modification. The processor 12B according to the fourth modification differs from the processor 12A according to the third modification in that the processor 12B includes a speaker identifier 129. The conference system 100 according to the fourth modification identifies who is speaking and adjusts the directionality of the microphone 16A to the direction of the speaker. Elements same as in the first embodiment and the third modification will be provided with the same reference symbols and will not be described any more.

The speaker identifier 129, as shown in FIG. 16, obtains audio signals from the microphone 16A. From the audio signals obtained, the speaker identifier 129 identifies who is speaking. More specifically, the speaker identifier 129 calculates cross-correlation among the audio signals obtained from the plurality of microphones 160 and calculates the times when the speaker's voice reached the respective microphones 160. The speaker identifier 129 can find out which direction the speaker's voice comes from, based on the relative positions of the microphones 160 and the times when the speaker's voice reached the respective microphones 160.

The processor 12B identifies the second object selected by the object selector 125 and additionally identifies who is speaking at the speaker identifier 129. The directionality adjuster 128 sets delays such that the directionality of the microphone 16A is adjusted to the person identified as a speaker.

The output data generator 127 generates output data based on image data focusing on the selected second object (for example, prototype 4) and audio data of the speaker's voice picked up by the microphone 16A.

The conference system 100 according to the fourth modification adjusts the directionality of the microphone 16A to a speaker and thereby can generate audio data emphasizing the speaker's voice while outputting image data of an image focusing on the selected second object. The conference system 100 according to the fourth modification adjusts the directionality of the microphone 16A not to the selected second object (for example, prototype 4) but to a speaker and thereby can generate output data that permits the discussion at the meeting to be easily understandable to the participants in a remote location.

In the above-described example, the speaker identifier 129 identifies who is speaking by means of audio signals picked up by the microphone 16A, but how the speaker identifier 129 identifies who is speaking is not limited to this. The speaker identifier 129 may identify who is speaking from image data. In this case, the speaker identifier 129 may identify who is speaking by recognizing faces by face recognition among the objects detected by the object detector 122 and by focusing on motions of the mouths in the faces. For example, the speaker identifier 129 may identify the face in which the mouth is moving at a specified time as a speaker.

[Other Modifications]

The direction of image pickup and the range of image pickup may be changed by image processing of image data picked up by the camera 14 or by mechanical or optical control of the camera 14.

The connection between the PC 2 and the terminal 1 is not limited to USB. The PC 2 and the terminal 1 may be connected by any other communication means, such as HDMI (registered trademark), LAN, Bluetooth (registered trademark), or the like.

The operator 32 is not limited to a touch panel and may include physical key switches.

The terminal 1 or 1A may switch to the automatic object detection mode, for example, when a shift of the remote 3 is detected within a specified period. With the conference system 100, for example, when a participant moves holding the remote 3 in his/her hand, the terminal 1 or 1A may switch to the automatic object detection mode, triggered by the shift of the remote 3 within a specified period.

In the above-described examples, as an object whose position relative to the first object (remote 3) satisfies a specified condition, the object positioned closest to the remote 3 is selected, but the selection of an object is not limited to this. In respect to the position relative to the remote 3, the conference system 100, for example, may select a second object that is on the right or on the left of the remote 3 on the screen. Alternatively, the conference system 100, for example, may define a direction of the remote 3 and select a second object that is positioned in the defined direction.

There may be more than one microphone 16.

The first object is not limited to the remote 3. The first object only needs to be an attachment to the terminal 1. The first object, for example, may be a laser pointer. In this case, the terminal 1 automatically zooms in a person holding the laser pointer. Accordingly, the terminal 1 can automatically zoom in a presenter (one of the participants). In this case, the terminal 1 may include a light-receptive sensor that receives lasers (light) from the laser pointer, and the terminal 1 may switch to the automatic object detection mode when the light receptive-sensor receives lasers.

The specified condition is not limited to the conditions described as examples in connection with the first embodiment.

It should be understood that the description of the embodiment is exemplification in every respect and is not limiting. The scope of the present disclosure is not limited to the above-described embodiment and is determined by the claims. Further, the scope of the disclosure includes equivalents of the scope of the claims.

What is claimed is:

1. A processing method of a conference system that includes a microphone, a camera, and a first object, the processing method comprising:
    obtaining image data of an image taken by the camera, the image data including a plurality of objects;
    detecting kinds and positions of a plurality of objects included in the image data obtained;
    identifying the first object and one or more second objects different from the first object based on the detected kinds of plurality of the objects from among the plurality of objects included in the obtained image data;
    calculating (i) a position of the first object and (ii) positions of the one or more second objects relative to the first object;
    selecting a second object, from among the one or more second objects, whose position relative to the first object satisfies a specified condition;
    generating focused image data that focuses on the selected second object; and
    generating output data based on the generated focused image data, which focuses on the selected second object, and audio data picked up by the microphone.

2. The processing method according to claim 1, further comprising calculating a distance between the first object and each of the one or more second objects,
    wherein the selecting the second object whose position relative to the first object satisfies the specified condition includes selecting a second object that is within a specified distance from the first object.

3. The processing method according to claim 1, further comprising:
    receiving, by an operator included on the first object, a user operation; and
    switching an output of the conference system between (i) the obtained image data of the image taken by the camera and (ii) the output data generated based on the generated focused image data according to the user operation received by the operator on the first object.

4. The processing method according to claim 1, further comprising receiving a selection command for selection of a kind of second objects,
    wherein the selecting the second object whose position relative to the first object satisfies the specified condition includes selecting a second object that satisfies the specified condition, out of one or more second objects of the kind specified by the selection command.

5. The processing method according to claim 1, further comprising receiving a tracking command for tracking a motion of the selected second object,
    wherein the generated output data includes the motion of the selected second object targeted for the tracking.

6. The processing method according to claim 1,
    wherein the generating focused image data that focuses on the selected second object includes performing image processing of the obtained image data to zoom in on the selected second object.

7. The processing method according to claim 1, further comprising adjusting a directionality of the microphone to the selected second object.

8. The processing method according to claim 1, further comprising:
identifying a person who is speaking; and
adjusting a directionality of the microphone to the person who is speaking.

9. The processing method according to claim 1, wherein the generating focused image data that focuses on the selected second object includes performing image processing of the obtained image data to focus on the selected second object or controlling the camera to obtain another image focused on the selected second object.

10. A conference system comprising:
a microphone;
a camera; and
a processor configured to:
  obtain audio data picked up by the microphone;
  obtain image data of an image taken by the camera, the image data including a plurality of objects;
  detect kinds and positions of a plurality of objects included in the image data obtained;
  identify a first object and one or more second objects different from the first object based on the detected kinds of plurality of the objects from among the plurality of objects included in the obtained image data;
  calculate (i) a position of the first object and (ii) positions of the one or more second objects relative to the first object;
  select a second object, from among the one or more second objects, whose position relative to the first object satisfies a specified condition;
  generate focused image data that focuses on the selected second object; and
  generate output data based on the generated focused image data, which focuses on the selected second object, and the audio data picked up by the microphone.

11. The conference system according to claim 10, wherein:
the processor is further configured to calculate a distance between the first object and each of the one or more second objects; and
the selected second object is a second object that is within a specified distance from the first object.

12. The conference system according to claim 10, wherein:
the first object includes an operator configured to receive a user operation; and
the processor is further configured to switch an output of the conference system between (i) the obtained image data of the image taken by the camera and (ii) the output data generated based on the generated focused image data according to the user operation received by the operator included on the first object.

13. The conference system according to claim 10, wherein:
the first object includes an operator configured to receive a selection command for selection of a kind of second objects; and
the selected second object is a second object that satisfies the specified condition, out of one or more second objects of the kind specified by the selection command.

14. The conference system according to claim 10, wherein:
the first object includes an operator configured to receive a tracking command for tracking a motion of the selected second object; and
wherein the generated output data includes the motion of the selected second object targeted for the tracking.

15. The conference system according to claim 10, wherein the processor is configured to generate the focused image data that focuses on the selected second object by performing image processing of the obtained image data to zoom in on the selected second object.

16. The conference system according to claim 10, wherein the processor is further configured to adjust a directionality of the microphone to the selected second object.

17. The conference system according to claim 10, wherein the processor is further configured to:
identify a person who is speaking; and
adjust a directionality of the microphone to the person who is speaking.

18. The conference system according to claim 10, further comprising
a communicator configured to send the generated output data to a device in a remote location and receive data including image data or audio data from the device in the remote location.

19. The conference system according to claim 10, wherein the processor is configured to generate the focused image data that focuses on the selected second object by performing image processing of the obtained image data to focus on the selected second object or by controlling the camera to obtain another image focused on the selected second object.

* * * * *